Nov. 24, 1959 D. H. BURNS 2,914,159
COIN OPERATED MEANS INCORPORATING CREDIT STORAGE
Filed Oct. 29, 1953
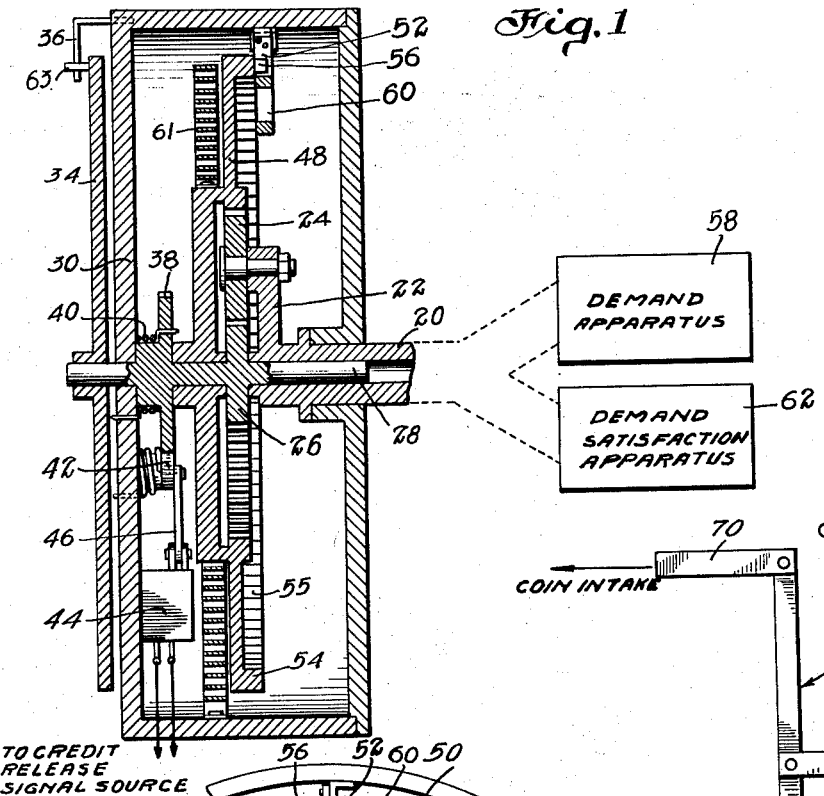
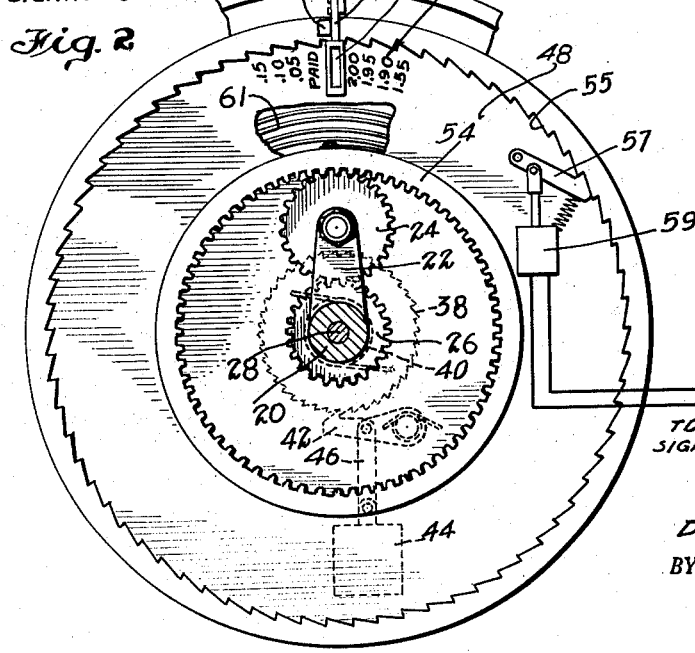
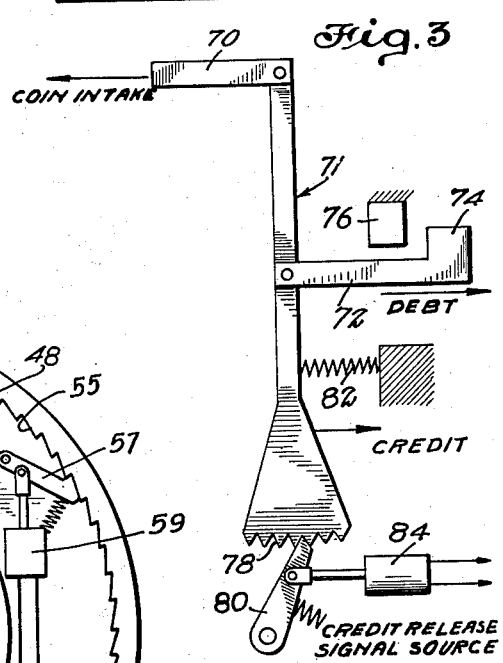
INVENTOR.
DAVID H. BURNS
BY
ATTORNEYS

United States Patent Office 2,914,159
Patented Nov. 24, 1959

2,914,159

COIN OPERATED MEANS INCORPORATING CREDIT STORAGE

David H. Burns, Los Angeles, Calif., assignor, by mesne assignments, to Paramount Pictures Corporation, New York, N.Y., a corporation of New York Application October 29, 1953, Serial No. 389,034

5 Claims. (Cl. 194—1)

The present invention relates to novel means and techniques for storing information and making this information available on demand at a future time. More specifically, the present invention relates to a coin-operated mechanism which incorporates means whereby any overpayment is automatically stored as a credit for future use.

While the present invention is described in connection with subscription television systems of the character described in the copending patent application of Gottfried et al., Serial No. 225,651, filed May 10, 1951, now Patent No. 2,769,026, and assigned to the present assignee, it is clear that certain aspects of the present invention are not necessarily limited to use in such subscription television system, but have broader application in any system wherein it is desired to store an overpayment in the form of a credit which may be applied to future operations, or to store energy, or a quantity expressed as an angle or linear displacement in excess of a required angle which may be applied to reduce a future required angle or displacement.

In general, the present invention involves the use of apparatus for establishing a coin demand or a so-called debt. Also, the apparatus incorporates means for satisfying such coin demand or debt. Further, the apparatus, in accordance with an important aspect of the present invention, incorporates means whereby any overpayment of the coin demand or debt is automatically stored as a credit and may be applied to reduce a debt established in another cycle of operation at a later time.

It is therefore a general object of the present invention to provide means and techniques for accomplishing the above-indicated functions and results.

A specific object of the present invention is to provide means and techniques whereby any overpayment of a debt due may be stored after the cycle of operation has been completed and the delivery of energy has ceased so that this credit may be applied to the debt of a second cycle of operation at a later time.

Another specific object of the present invention is to incorporate apparatus of the character described in a subscription television system.

Yet another object of the present invention is to provide a system wherein an angular deflection may be established representative of a required charge and an overpayment of said required charge is stored and may be applied to reduce a subsequently established angular deflection representative of another required charge.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 is an irregular sectional view taken through apparatus shown in Figure 2 and shows a system embodying features of the present invention.

Figure 2 is a view partly in elevation and partly in section of a portion of the apparatus illustrated in Figure 1.

Figure 3 illustrates another embodiment of the invention.

Briefly, as described in the above-mentioned copending application, a subscription television system of the type with which the subject invention is intended to be used incorporates a television receiver having a cathode-ray tube and associated unscrambling or decoding apparatus which is selectively connected to the receiver through a relay switch. Normally, the switch is in a position to decouple the decoding apparatus from the television set. Accordingly, a so-called nonstandard or scrambled transmission results in a so-called scrambled unintelligible or unavailable picture on the face of the cathode-ray tube and a normal or standard transmission results in a clear picture on the face of the cathode-ray tube.

In the case of the so-called nonstandard or scrambled transmission, it is necessary that the unscrambling or decoding apparatus be coupled to the television set to cause a clear picture on the face of the cathode-ray tube. This is accomplished by energizing the relay switch to couple the decoder to the receiver, in which case an output developed in the receiver is applied to the unscrambling or decoding apparatus, and the output of the apparatus is returned to the receiver to clarify the picture shown on the cathode-ray tube screen.

For revenue purposes, the relay winding is not energized and therefore the decoder is not coupled to the receiver unless a coin demand has been acknowledged or satisfied. Such coin demand may be established by the program transmitting station in a number of ways. One of these is to transmit pulses which are received by the receiver and applied to a solenoid which is energized responsive to each pulse. This successive solenoid energization can be used, in well known manner, to rotate a wheel a given amount for each pulse thus establishing a coin demand as an angle of rotation of a wheel, or a rack bar may be laterally moved a given amount for each solenoid energization thus establishing a coin demand as the lateral distance moved by a bar. Still another system is to direct the amount and direction of rotation of a motor by the pulses being transmitted. In any event, these mechanisms are not part of the present invention as they are well known in the automatic and remote control fields; however, they are recited since they are exemplary of apparatus which may be used in conjunction with the present invention. Subscription television systems employing coin demand mechanism of the general type indicated are described and claimed in Patent No. 2,769,023 to Loew et al., for Prepaid Entertainment Distribution System, and Patent No. 2,769,026 to Gottfried et al., for Prepaid Entertainment Distribution System.

Reference is now made to the embodiment of the invention shown in Figures 1 and 2. Figure 1 is a cross section of the apparatus shown in Figure 2 which, for the sake of clarity, has certain features omitted which are shown in Figure 1.

An outer shaft 20 has mounted thereon a spider or crank 22, the crank 22 having rotatably mounted on the free end thereof the planetary gear 24. The gear 24 meshes with a spur or sun gear 26 which is mounted on a shaft 28. The shaft 28 has one of its ends journaled for rotation in the outer shaft 20 and the other one of its ends journaled for rotation in one arm of the housing. The other arm of the housing or stationary support rotatably receives the outer shaft 20.

Also mounted on the shaft 28 is a credit dial 34 which has suitable markings thereon and which co-operates with a suitable stationary index 36 for indicating any credit which may exist. A stop pin 63 is also mounted on the dial 34. The shaft 28 mounts a ratchet wheel 38 which is engaged by one end of a torsion spring 40, the other end of the torsion spring 40 being anchored on the stationary support 30 so that such ratchet wheel 38 tends to rotate in the clockwise direction, as seen in Figure 2. The spring 40 is exemplary of a mechanism to provide a required torque in a clockwise direction. Other mechanisms may be used to provide such torque such as a torque motor, or one leg of a differential.

Such clockwise rotation of the ratchet wheel 38 and shaft 28, however, is prevented by a pawl 42 which is pivotally mounted on the stationary supporting plate 30, at one end thereof. This pawl 42 may be withdrawn from engagement with the ratchet wheel 38 by any desirable mechanism, operable on demand, which is suitable for the purpose. Exemplary of such a mechanism is a solenoid 44 having its armature 46 pivotally attached to said pawl. The solenoid 44 itself is mounted on the stationary supporting plate 30. It is actuated from a signal source designated as a credit release signal source.

The zero coin credit position may be said to be a neutral position, movement away from which is prevented in one direction by the pawl and the cooperating stops 36 and 63 and in the other direction by the torsion spring 40 which constitutes a yieldable bias.

On the shaft 28 there is rotatably mounted a demand dial 48 which carries suitable indicia marks 50, a stop 56, and an internal gear 54, which meshes with the aforementioned gear 24. The outer periphery of the demand dial also has a lip the inner portion of which has ratchet teeth 55. A solenoid actuated pawl 57 engages these teeth so that the demand dial is prevented from being driven in a clockwise direction unless the solenoid 59 is energized, thereby disengaging the pawl.

A clock spring 61 has one end attached to the cross member of the housing 30 and the other end attached to the demand dial in a manner to urge the demand dial clockwise until the blank position, on the demand dial between the "paid" position and the "2-dollar" position, is under an indicator window 60. At this time the two stops 52, 56 are engaged to prevent further clockwise motion.

As previously pointed out there are a number of suitable ways of establishing, from a television transmitting station, a mechanical displacement either linear, angular or rotational, which is representative of a coin demand. With the embodiment of the invention shown in Figures 1 and 2, rotation or angular displacement of this type may be readily communicated to the outer shaft 20 from a suitable mechanism, of the type previously described, and which is represented by a rectangle 58.

A starting position for the embodiment of the invention is the one shown in Figures 1 and 2 with the blank space on the demand dial under the indicator. The transmitting station which wishes to transmit a program which is scrambled until paid for, transmits signals which actuate the demand apparatus 58. This applies a force to the outer shaft which drives it in a counterclockwise direction. Counterclockwise rotation of the outer shaft is communicated to the crank or spider 22, which is thereby rotated counterclockwise. The ratchet wheel 38 is prevented from rotating counterclock by operation of the torsion spring 40 which holds it and sun gear 26 with it. The torsion exerted by spring 40 also must be sufficient to overcome that exerted by spring 61. The planetary gear 24 accordingly rotates on its own axis and travels around the sun gear in a counterclockwise direction rotating the demand dial along with it. The transmitting station may transmit pulses to reduce the amount indicated by the demand dial to a demand amount in successive increments or by a continuous movement, as desired. The drive of the demand dial to the demand amount has the effect of winding up the clock spring. The tendency of the spring to release its energy and drive the demand dial clockwise is prevented by operation of the ratchet teeth 55 and pawl 57. The coin demand established may be seen through the stationary indicating aperture 60. The demand angle is the angle between the indicated coin demand and the "paid" position on the demand dial.

For the purposes of explanation, assume that a coin demand of 25 cents has been established, i.e., the demand dial has been rotated counterclockwise until 25 cents is seen in the indicating aperture 60. In order to satisfy such demand the demand dial must be rotated counterclockwise through the demand angle until the dial stop 56 abuts the stationary stop 52 on the other side from the position shown in Figure 2. At this time "paid" appears in the indicating aperture 60. The sum of the angles subtended by stops 52 and 56 must equal the angular space between any two indices on dial 48 so that in its extreme position "paid" and "blank" appear in the aperture 60.

Coin demand satisfaction apparatus as represented by the rectangle 62 operates in response to coins being inserted therein to apply a counterclockwise rotation to the outer shaft 20. Such coin demand satisfaction apparatus may be any of the types previously discussed or any well known coin operated mechanism which provides a rotation proportional to or representative of the value of the coins deposited therein.

Upon the insertion of the required 25 cents in the coin demand satisfaction apparatus it operates to turn the shaft 20 counterclockwise. The ratchet gear 38 and accordingly the sun gear 26 are prevented from moving by the spring bias. Accordingly the planetary gear is rotated and revolved by the crank and thereby the internal gear and demand dial 48 are rotated to the paid position at the stop.

It is well within the ability of those skilled in the art to provide apparatus wherein the demand dial, when it reaches its paid position, closes a switch which causes the decoder to become coupled to the receiver and unscramble the coded transmission. This may be simply achieved by using the two portions of the stops 52, 56 which contact each other at the "paid" position as switch contacts.

At the termination of a said program, the solenoid 59 is energized to move the pawl 57, thus permitting the clock spring 61 to reset the demand dial to the position shown in Figure 2. This reset may be accomplished, for example, by means of a signal which is sent out by the transmitter and received by the receiver for the purpose of energizing the solenoid 59 for a period long enough to permit the clock spring 61 to drive the demand dial 48 clockwise back to its blank indicating position with the stops 52 and 56 back in the position shown in Figure 2. During the time solenoid 59 is energized shaft 20 must be uncoupled from demand apparatus 58 and demand satisfaction apparatus 62, permitting the gear 24 to revolve and rotate freely in accommodation of the rotation of gear 54. The signal used to energize the solenoid 59 may, if desired, be a tone signal which is detected at the receiver and, in well known fashion, channeled to the solenoid 59 by means of a filter. The apparatus is then reset in condition to establish a new demand. The solenoid 59 may also be actuated by turning off the set, if desired.

In the above discussion, it was assumed that the exact amount of coins was placed in the coin demand satisfaction apparatus 62. If, however, more than the required amount of coins is placed in the demand satisfaction apparatus 62, there is, of course, an overpayment and the apparatus embodying my invention stores such overpayment as a credit in the manner now described.

Assuming that, instead of placing 25 cents in the demand satisfaction apparatus, as described above, 50 cents were placed therein. In such case, we may expect a credit of 25 cents. The first 25 cents results in a coin satisfaction or acknowledgment, as described previously, which serves to place the abutment 52 in contact with the stationary stop 56 so that the demand dial 48 is thereafter prevented from rotating counterclockwise. The crank 22, however, continues to rotate an angular distance corresponding to the additional excess amount of 25 cents. The gear 24, since the demand dial is now stationary, rotates in the clockwise direction to cause the gear 26 and the ratchet wheel 38 both to rotate in the counterclockwise direction against the resistance offered by torsion spring 40. Consequently, the ratchet wheel 38 is rotated around an angular distance corresponding to a credit of 25 cents, i.e., five notches. Each notch in the ratchet wheel 38 may correspond to 5 cents for the purposes of illustration. The credit of 25 cents is indicated on the credit dial 34 which co-operates with the stop pointer 36 on the stationary element. Credit dial 34 also carries a stop 63 which co-operates with the stop pointer 36 to prevent rotation of the credit dial clockwise from its zero credit position.

This credit of 25 cents thus established may be realized or expended by releasing the pawl 42, using the exemplary solenoid 44 or other mechanical means for that purpose. The solenoid 44 may be inergized to release the pawl 42 upon the insertion of an additional coin or, if desired, may be left to the discretion of the user by providing a push button at the receiving set which, when energized, energizes the solenoid 44, thus releasing the pawl 42 and applying the credit to the price of a program.

It is observed that when the pawl 42 is released the ratchet wheel 38 and gear 26 rotate in the clockwise direction in Figure 2 to cause counterclockwise rotation of the gear 24. Such counterclockwise rotation of the gear 24 results in counterclockwise rotation of the demand dial 48 (assuming, of course, that the stops 52 and 56 are not in engagement in the paid position), so that releasing of the pawl 42 under such circumstances has the same effect as inserting coins in the coin demand satisfaction apparatus 62. In other words, development of coin satisfaction motion by outer shaft 20 and releasing of the pawl 42 (assuming that the dial stops are not in engagement and assuming further that there is some credit stored) both, independently, cause counterclockwise rotation of the dial so as to satisfy or partially satisfy the coin demand which has been previously established, it being noted that, for all intents and purposes, a coin demand is deemed to have been established when the elements or stops 52 and 56 are out of engagement.

It may happen that not all the credit which is stored is required for satisfying a coin demand. In this event, since, when the "paid" position is achieved by the demand dial, stop 63 has not engaged stop 36, the pawl 42 is permitted to engage the ratchet wheel 38 again and the remaining credit is stored until required.

It should be borne in mind that when the credit storage system is reset for a new demand the credit stored is not affected by this operation. The pawl 42 prevents clockwise rotation when the demand dial is driven clockwise by the clock spring. Accordingly, the planetary gear 24 will merely roll around the sun gear 26 until it assumes the position shown in Figure 2. Likewise, when a new demand is being established, the torque spring 40 prevents any additional credit being added by the drive on the planetary gear until the demand dial 48 is held by the stops in the "paid" position and an overpayment has been made.

In the construction of the device, due care must be given to the size of the gear teeth and the gear ratios involved, in order that the proper relationship be maintained between the demand dial increments as established by the drive from the planetary gear, the credit being stored by the drive of the sun gear from the planetary gear, and the credit being paid by the drive of the demand dial from the sun gear via the planetary gear. This is well within the skill of one versed in this art, however.

Instead of using an internal gear differential employing spur gears, bevel gears, crown gears, crossed axis helical gears, double sun slot gears or friction discs may be employed instead.

Referring now to Figure 3, there is shown a linear differential which exemplifies how coin credit storage may be achieved using this type of apparatus. This linear differential is sometimes known as a whiffletree. At one end of its beam 71, the whiffletree has a member 70 pivotally mounted thereto and substantially at right angles. At its middle portion, the beam of the whiffletree has another member 72 extending in the opposite direction from the member 70 and also pivotally mounted to the beam. This middle member has a portion 74 which is bent to engage a permanent stop 76 when it is moved to its extreme position, which, with reference, to the figure, is to the left. The bottom of the beam is made in the form of ratchet teeth 78. A pawl 80 is in contact with these ratchet teeth in a manner to prevent motion to the left, which can occur when a compression spring 82 is compressed and thus can serve to urge the beam of the whiffletree to the left. Normally with zero credit and zero debt the middle member 72 engages its permanent stop and the pawl engages the tooth on the extreme right. When a debt or demand is applied, it is manifested by motion of parts 70, 71, 72, and 74 about pawl 80 as a fulcrum to the right.

The distance between the lip 74 of the middle member 72 and its stop is representative of the amount of debt which must be satisfied. For the satisfaction of the debt, the coin demand satisfaction apparatus applies its energy to the upper member 70 to move it to the left in accordance with the amount deposited. Motion to the left of the upper member, of course, causes the lower member to move therewith, thereby moving the middle member toward its stop to satisfy the demand. By means of the ratchet pawl at the bottom of the whiffletree member, no credit can be entered or stored until the middle member engages its stop. Then the further deposit of coin causes the continued motion of the upper member to the left. This results in a pivotal action of the beam about the junction with the middle member. The ratchet and pawl thus are caused to perform a ratcheting action, enabling the pawl to engage the ratchet teeth in succession. The number of teeth which are moved, of course, depends upon the amount of the coin payment in excess of the debt. Each tooth may be representative of a desired coil denomination, such as 5 cents. Thus in the illustration the credit deposited amounts to 10 cents or 2 teeth away from the initial or starting position.

In pivoting the beam for the purpose of providing credit, the compression spring is compressed and thereby provides energy to urge the beam in the opposite direction. The ratchet 78 and pawl 80 arrangement prevents this. For the purpose of establishment of coin demand and coin demand satisfaction operation, the whiffletree differential may be operated on and will perform in the manner described above, even with the ratchet and pawl engaged in a credit storing position. However, at any time when a debt has been established and it is desired to apply the credit against the debt, a solenoid 84 can be actuated to retract the pawl from engaging the ratchet teeth. Then, under the urging of the compression spring the beam is moved to the left a distance determined by the amount of credit which was stored. The debt is reduced accordingly. The solenoid 84 when deactivated permits the pawl to engage the ratchet teeth again. If the entire credit was used to satisfy the debt, the pawl goes back to the zero credit position. If only a portion of the credit was used to satisfy the debt, the pawl returns to the ratchet teeth and stores the remaining credit until required.

Accordingly, there has been described hereinabove novel and useful apparatus for representing a coin demand, for satisfying such coin demand and for storing or crediting any overpayment of coin which can be used to reduce any subsequent demand and those basic principles have been applied using the two known forms of differential. Such credit storage device finds application in subscription television system or in any other system wherein a coin box or pay station is maintained to meter a service and the subscriber, not always having the exact coinage required for the service, can deposit the excess to have it saved and credited against a subsequent demand.

I claim:

1. A system for storing an angular deflection in excess of the required angular deflection comprising a rotatably mounted sun gear, means to yieldably bias said sun gear to rotate in one direction, means to releasably hold said sun gear against rotation in said one direction, a planetary gear, an internal gear mounted to be rotatable on the same axis as said sun gear, means to mount said planetary gear between and in revolving contact with said sun gear and said internal gear, means to establish a first stop position for said internal gear, means to establish a second stop position for said internal gear a predetermined angle of rotation away from said first stop position, means to rotatably revolve said planetary gear to drive said internal gear in a direction opposite to said one direction to position it a required angular deflection away from said second stop position, second means to rotatably revolve said planetary gear in said opposite direction through an angle in excess of said required angular deflection to move said internal gear to said second stop position and to rotate said sun gear against the bias of said means to yieldably bias through an angle representative of said excess of said required angular deflection whereby said excess of said required angular deflection is stored as said representative angle, and means operable to release said sun gear holding means to permit said means to yieldably bias to rotate said sun gear through said excess angle thereby rotating said planetary gear and said internal gear to reduce a subsequently established required angular deflection in accordance with the representative angle stored.

2. The combination with a differential gearing system of the type including a rotatably mounted sun gear, an internal gear mounted to be rotatable on the same axis as said sun gear, and a planetary gear mounted between and in revolving contact with said sun gear and said internal gear, of means to yieldably bias said sun gear against rotation in one direction, a pawl positioned to hold said sun gear against rotation in the opposite direction, means to establish a first stop position for said internal gear, means to establish a second stop position for said internal gear a predetermined angle of rotation away from first stop position, means to rotatably revolve said planetary gear in a direction opposite to said one direction through an angle in excess of that required to rotate said internal gear to said second stop position whereby said sun gear is rotated from the position held by said pawl against said bias means through an angle representative of said excess of said required angular deflection, and means to move said pawl from its holding position to permit said yieldably biasing means to rotate said sun gear through said angle representative of said excess angle thereby rotating said internal gear in said opposite direction through said excess angle.

3. In a receiving system, an improved mechanism for collecting payment for the value of a program comprising a price-indicating mechanism movable to a plurality of positions each of which represents a different money value and having a paid-up position, means to move said price-indicating mechanism to a position representative of an amount demanded for a program, means for receiving coinage for payment of said demanded amount, means responsive to the deposit of coinage in said means for receiving coinage for moving said price-indicating mechanism toward said paid-up position, means to store an amount of energy representative of the value of coinage deposited in excess of the amount demanded, means operable when said price-indicating mechanism is at said paid-up position to actuate said means to store responsive to said means for moving said price-indicating mechanism toward said paid-up position, means for moving said price-indicating mechanism away from said paid-up position, and means to release said stored energy to move said price-indicating mechanism toward said paid-up position to reduce a subsequently demanded amount for a subsequent program by the value of the excess coinage.

4. In a subscription television system of a type wherein different television programs are transmitted to subscriber receivers, wherein each subscriber must pay a separate price for each television program desired, and wherein there are transmitted to each subscriber receiver signals for each program representative of the price the payment of which is required for viewing said program, the improvement comprising indicator means at each receiver for indicating in response to said signals for a program the price for viewing that program, said indicator means also having a no-price indicating condition from which it is actuated by said signals for a program, means for receiving coins for payment of said indicated price, means for reducing the price indicated by said indicator means responsive to the amount of coinage paid by said means for receiving coins, means for storing a physical quantity representative of an overpayment of said indicated price into said means for receiving coins, means rendered operative responsive to the means for reducing the price indicated by said indicator means and to said indicator means indicating full payment of said price to actuate said storing means, means for resetting said indicator means to its no-price indicating condition, means actuatable upon the subsequent operation of said indicator means for indicating the price for viewing another program for applying the stored representative physical quantity to said means for indicating to reduce the amount required for payment of the indicated price in accordance with the previous overpayment and means for actuating said last-named actuatable means.

5. In a system for receiving and reproducing program material from a protected signal transmission, said system including translating means actuatable to render available said program material from said protected transmission, a coin-operated control means comprising means for establishing a demand for a stated amount of coin for obtaining program material including a first element movable along a predetermined path, means establishing a paid-up position adjacent the path of said movable first element, and means for positioning said first element at a distance from said paid-up position representative of said stated amount, means for receiving coins for payment of said stated amount, means responsive to said means for receiving coins for moving said first movable element toward said paid-up position a distance along said path representative of the value of a coin received by said means for receiving coins, means for actuating said translating means in response to said first element reaching said paid-up position, a second element movable along a predetermined path and having said paid-up position at one end thereof, means actuatable after said first element has reached its paid-up position and responsive to said means for moving said first element for moving said second element a distance from said paid-up position representative of the value of a coin received by said means for receiving coins in excess of said stated amount whereby the distance of said second element beyond said paid-up position represents an overpayment of said stated amount, means actuated by the motion of said second element from said paid-up position for storing a quantity of energy representative of the distance moved by said second element from said paid-up position, means for moving said first element away from said paid-up position, means actuatable upon a subsequent stated amount being demanded by said means for establishing a demand for a stated amount for applying said stored quantity of energy to said first element for reducing the distance between said first element and said paid-up position by a distance equal to that of said second element from said paid-up position, for reducing said subsequently stated amount by the previous overpayment, and means for actuating said last-named actuatable means.

References Cited in the file of this patent

UNITED STATES PATENTS

| | | |
|---|---|---|
| 1,743,777 | Hornby | Jan. 14, 1930 |
| 2,271,752 | Wickham | Feb. 3, 1942 |
| 2,323,255 | Sutherland | June 29, 1943 |
| 2,329,306 | Thatcher | Sept. 14, 1943 |